US011934118B2

(12) United States Patent
Taguchi et al.

(10) Patent No.: US 11,934,118 B2
(45) Date of Patent: Mar. 19, 2024

(54) FUSER

(71) Applicant: BROTHER KOGYO KABUSHIKI KAISHA, Nagoya (JP)

(72) Inventors: Kazuna Taguchi, Nagoya (JP); Mingguang Zhang, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/839,616

(22) Filed: Jun. 14, 2022

(65) Prior Publication Data

US 2022/0308506 A1 Sep. 29, 2022

Related U.S. Application Data

(62) Division of application No. 17/166,627, filed on Feb. 3, 2021, now Pat. No. 11,402,773.

(30) Foreign Application Priority Data

Feb. 7, 2020 (JP) ................................ 2020-019248
Feb. 7, 2020 (JP) ................................ 2020-019260

(51) Int. Cl.
*G03G 15/20* (2006.01)

(52) U.S. Cl.
CPC ..... *G03G 15/2017* (2013.01); *G03G 15/2042* (2013.01); *G03G 15/2053* (2013.01); *G03G 15/2064* (2013.01); *G03G 2215/2038* (2013.01)

(58) Field of Classification Search
CPC ........... G03G 15/2017; G03G 15/2039; G03G 15/2053; G03G 2215/2003
See application file for complete search history.

(56) References Cited

U.S. PATENT DOCUMENTS

2002/0028089 A1* 3/2002 Yoneda .............. G03G 15/2064 399/122
2007/0177895 A1 8/2007 Yano
(Continued)

FOREIGN PATENT DOCUMENTS

JP 2003-302288 A 10/2003
JP 2004-354517 A 12/2004
(Continued)

OTHER PUBLICATIONS

Notice of Reasons for Refusal issued in the corresponding Japanese application No. 2020-019260, dated Oct. 31, 2023.

*Primary Examiner* — Thomas S Giampaolo, II
(74) *Attorney, Agent, or Firm* — Merchant & Gould P.C.

(57) ABSTRACT

A fuser configured to nip a sheet by a heating member and a pressurizing member and to thermally fix an image formed in a toner on the sheet, is provided. The fuser includes a supporting member, a temperature sensor, and a sensor cover. The supporting member supports the heating member. The temperature sensor is attached to the supporting member and is configured to detect a temperature of the heating member without contacting the heating member. The sensor cover is located on a side of the temperature sensor opposite to the heating member to cover the temperature sensor. The sensor cover includes a base having an opening at an upper position with respect to the temperature sensor and a windshield wall located in adjacent to the base. The windshield wall protrudes upward and extends in a lengthwise direction for the heating member.

13 Claims, 8 Drawing Sheets

(56) References Cited

U.S. PATENT DOCUMENTS

| | | | |
|---|---|---|---|
| 2007/0217819 A1 | 9/2007 | Sone et al. | |
| 2010/0028036 A1 | 2/2010 | Aratachi et al. | |
| 2014/0086645 A1 | 3/2014 | Yasuda et al. | |
| 2016/0187821 A1 | 6/2016 | Onishi | |
| 2017/0227896 A1* | 8/2017 | Imazu ................ | G03G 15/2028 |
| 2021/0011406 A1 | 1/2021 | Zhang et al. | |

FOREIGN PATENT DOCUMENTS

| | | |
|---|---|---|
| JP | 2006-118993 A | 5/2006 |
| JP | 2007-187833 A | 7/2007 |
| JP | 2007-199614 A | 8/2007 |
| JP | 2010-38965 A | 2/2010 |
| JP | 2010-204551 A | 9/2010 |
| JP | 2014-63009 A | 4/2014 |
| JP | 2015-176074 A | 10/2015 |
| JP | 2016-122089 A | 7/2016 |
| JP | 2019-174666 A | 10/2019 |

* cited by examiner

FUSER

CROSS REFERENCE TO RELATED APPLICATION

This application is a divisional of U.S. patent application Ser. No. 17/166,627, filed Feb. 3, 2021, now U.S. Pat. No. 11,402,773, which claims priority from Japanese Patent Applications Nos. 2020-019248 and 2020-019260, both filed on Feb. 7, 2020, the entire subject matters of which are incorporated herein by reference.

BACKGROUND

Technical Field

An aspect of the present disclosure is related to a fuser.

Related Art

A fuser having a fusing unit, which may nip a recording medium between a heat roller and a pressure roller to thermally fix a toner on the recording medium, is known.

The fusing unit may include a temperature sensor. The temperature sensor may include an infrared-detectable thermistor and a temperature-compensating thermistor to detect a temperature of the heat roller without contacting.

SUMMARY

In the known fusing unit, however, it may be difficult to restrain the air around the temperature detector from flowing, and detected results from the infrared-detectable thermistor and the temperature-compensating thermistor may deviate depending on the conditions of the air current. In this regard, it may be difficult to improve sensing accuracy of the temperature sensor.

The present disclosure is advantageous in that a fuser, which may improve sensing accuracy of a temperature sensor, is provided.

According to an aspect of the present disclosure, a fuser configured to nip a sheet by a heating member and a pressurizing member and to thermally fix an image formed in a toner on the sheet, is provided. The fuser includes a supporting member, a temperature sensor, and a sensor cover. The supporting member supports the heating member. The temperature sensor is attached to the supporting member and is configured to detect a temperature of the heating member without contacting the heating member. The sensor cover is located on a side of the temperature sensor opposite to the heating member and covers the temperature sensor. The sensor cover includes a base having an opening at an upper position with respect to the temperature sensor, and a windshield wall located in adjacent to the base. The windshield wall protrudes upward and extends in a lengthwise direction for the heating member.

According to another aspect of the present disclosure, a fuser configured to nip a sheet by a heating member and a pressurizing member and to thermally fix an image formed in a toner on the sheet, is provided. The fuser includes a supporting member, a temperature sensor, and a plurality of ribs. The supporting member supports the heating member. The temperature sensor includes a temperature-detecting element. The temperature sensor attached to the supporting member is configured to detect a temperature of the heating member without contacting. The plurality of ribs are arranged on the supporting member. The plurality of ribs extend in a rotating direction for the heating member along an outer circumferential surface of the heating member at positions different from the temperature-detecting element in a lengthwise direction for the heating member. The plurality of ribs includes a first rib and a second rib. The first rib has a face facing the outer circumferential surface. The second rib is located apart farther than the first rib from the temperature-detecting element in the lengthwise direction and has a face facing the outer circumferential surface. A length of the face of the first rib in the lengthwise direction is greater than a length of the face of the second rib in the lengthwise direction.

BRIEF DESCRIPTION OF THE ACCOMPANYING DRAWINGS

DETAILED DESCRIPTION

Hereinafter, an embodiment of the present disclosure will be described with reference to the accompanying drawings.

Embodiment

Figure 1:
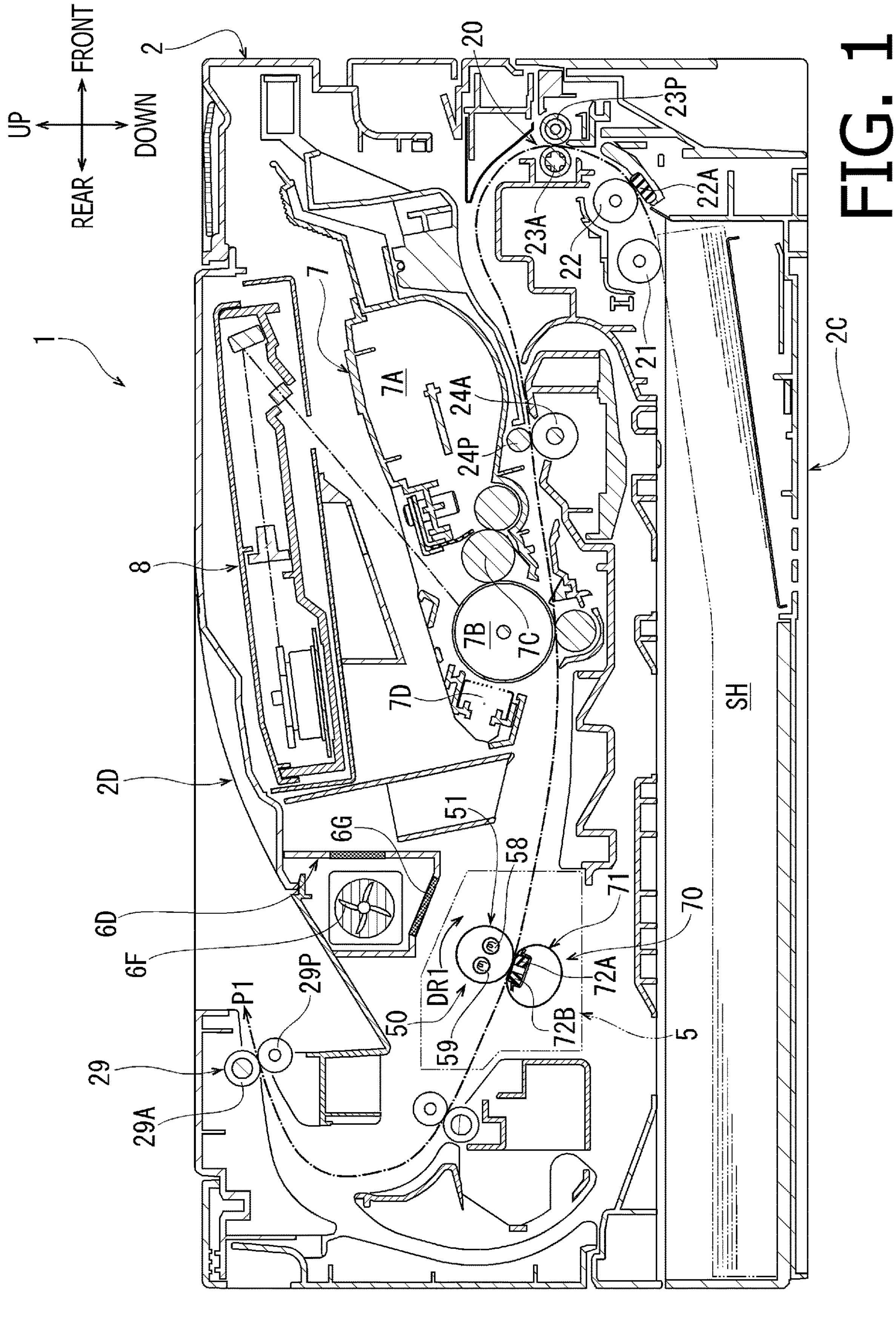
FIG. 1 is an illustrative cross-sectional view of an image forming apparatus with a fuser according to an embodiment of the present disclosure.

As shown in FIG. 1, a fuser 5 according to the embodiment of the present disclosure may be situated in an image forming apparatus 1. The image forming apparatus 1 is a laser printer capable of forming an image on a sheet SH electro-photographically.

In the embodiment described below, directions related to parts and members included in the image forming apparatus 1 will be mentioned on basis of an orientation of the image forming apparatus 1 with reference to arrows in each drawing. For example, a right-hand side and an upper side in FIG. 1 to a viewer are defined as a front side and an upper side of the image forming apparatus 1, respectively. A left-hand side to a user who faces the front side of the image forming apparatus 1, i.e., a nearer side to the viewer, is defined as a leftward side. A right-to-left or left-to-right direction may be called as a crosswise direction, a front-to-rear or rear-to-front direction may be called as a front-rear direction, and an up-to-down or down-to-up direction may be called as a vertical direction. Directions related to the image forming apparatus 1 in FIGS. 2-8 are similarly based on the orientation of the image forming apparatus 1 as defined above and correspond to those with respect to the image forming apparatus 1 shown in FIG. 1 even when the drawings are viewed from different angles.

In the following paragraphs, an overall configuration of components in the image forming apparatus 1 will be described with reference to FIG. 1, and later the fuser 5 will be described in detail.

<Overall Configuration of the Image Forming Apparatus>

As shown in FIG. 1, the image forming apparatus 1 includes a main body 2, a feeder 20, a process cartridge 7, a scanner 8, a fuser, and an ejection device 29.

The main body 2 includes a casing and frames which are not shown in the drawings. At a lower position in the main body 2, a sheet cassette 2C may be detachably attached. In the sheet cassette 2C, sheets SH, on which images may be formed, may be stacked. The sheets SH may be, for example, paper sheets or OHP sheets.

The main body 2 has an ejection tray 2D formed on a top face thereof. On the ejection tray 2D, the sheets SH with the images formed thereon being ejected outside the casing may be placed. The feeder 20, the process cartridge 7, the scanner 8, and the ejection device 29 may be fixed to the frames, which are not shown, in the main body 2 at positions higher than the sheet cassette 2C.

Inside the main body 2, a conveyer path P1 is formed. The conveyer path P1 is a path extending upward from a frontward end of the sheet cassette 2C and turning in a shape of U, extending rearward therefrom approximately horizontally, through the process cartridge 7 and the fuser 5, turning upward in another shape of U, and through the ejection device 29 to the ejection tray 2D.

The feeder 20 has a feed roller 21, a separation roller 22, and a separation pad 22A, which may feed the sheets SH stored in the sheet cassette 2C to the conveyer path P1 one by one. The feeder 20 further has a conveyer roller 23A and a pinch roller 23P; and a registration roller 24A and a pinch roller 24P; which are arranged along the conveyer path P1 to convey the sheets SH to the process cartridge 7.

The process cartridge 7 may include, but not be limited to, a toner container 7A, a photosensitive drum 7B, a developing roller 7C, and a charger 7D, which may be in a known configuration.

The scanner 8 is located at an upper position with respect to the process cartridge 7. The scanner 8 may include, but not be limited to, a laser-beam emitter, a polygon mirror, an fθ lens, and a reflection mirror, which may be in known configurations. The scanner 8 may emit a laser beam from the upper position at the photosensitive drum 7B in the process cartridge 7.

As the photosensitive drum 7B rotates, a surface of the photosensitive drum 7B may be positively charged evenly by the charger 7D and exposed to the scanning laser beam emitted from the scanner 8. Thereby, an electrostatic latent image, which corresponds to an image to be formed on the sheet SH, may be formed on the surface of the photosensitive drum 7B. The developing roller 7C may supply a toner from the toner container 7A to the electrostatic latent image on the surface of the photosensitive drum 7B. Thereby, an image may be formed in the toner on the surface of the photosensitive drum 7B. The image in the toner may be transferred onto the sheet SH being conveyed through the process cartridge 7.

The fuser 5 is located rearward with respect to the process cartridge 7. The fuser 5 includes a heating member 50, which is located on an upper side of the conveyer path P1, and a pressurizing member 70, which is located on a lower side of the conveyer path P1 to face the heating member 50 across the conveyer path P1. The fuser 5 may nip the sheet SH between the heating member 50 and the pressurizing member 70 to thermally fix the image in the toner onto the sheet SH.

The ejection device 29 has an ejection roller 29A and an ejection-pinch roller 29P, which may eject the sheet SH with the image formed in the toner and fixed thereon at the ejection tray 2D.

The image forming apparatus 1 includes an exhaust duct 6D and an exhaust fan 6F. The exhaust duct 6D is located at an upper position in the main body 2 with respect to the fuser 5. The exhaust fan 6F is arranged on a side face of the main body 2 on the right, which is on the farther side in FIG. 1. When the exhaust fan 6F operates, the air inside the main body 2 may be emitted through the exhaust duct 6D outside the main body 2.

As some of the air is emitted, due to negative pressure caused by the exhaust fan 6, the air around the fuser 5 may flow through a filter 6G, which is located on a bottom of the exhaust duct 6D, to enter the exhaust duct 6D. Therefore, some of the air around the process cartridge 7 may flow rearward, toward the fuser 5. Moreover, the air involved with the sheet SH being conveyed through the process cartridge 7 to the fuser 5 may flow rearward, toward the fuser 5.

<Detailed Configuration of the Fuser>

Figure 2:
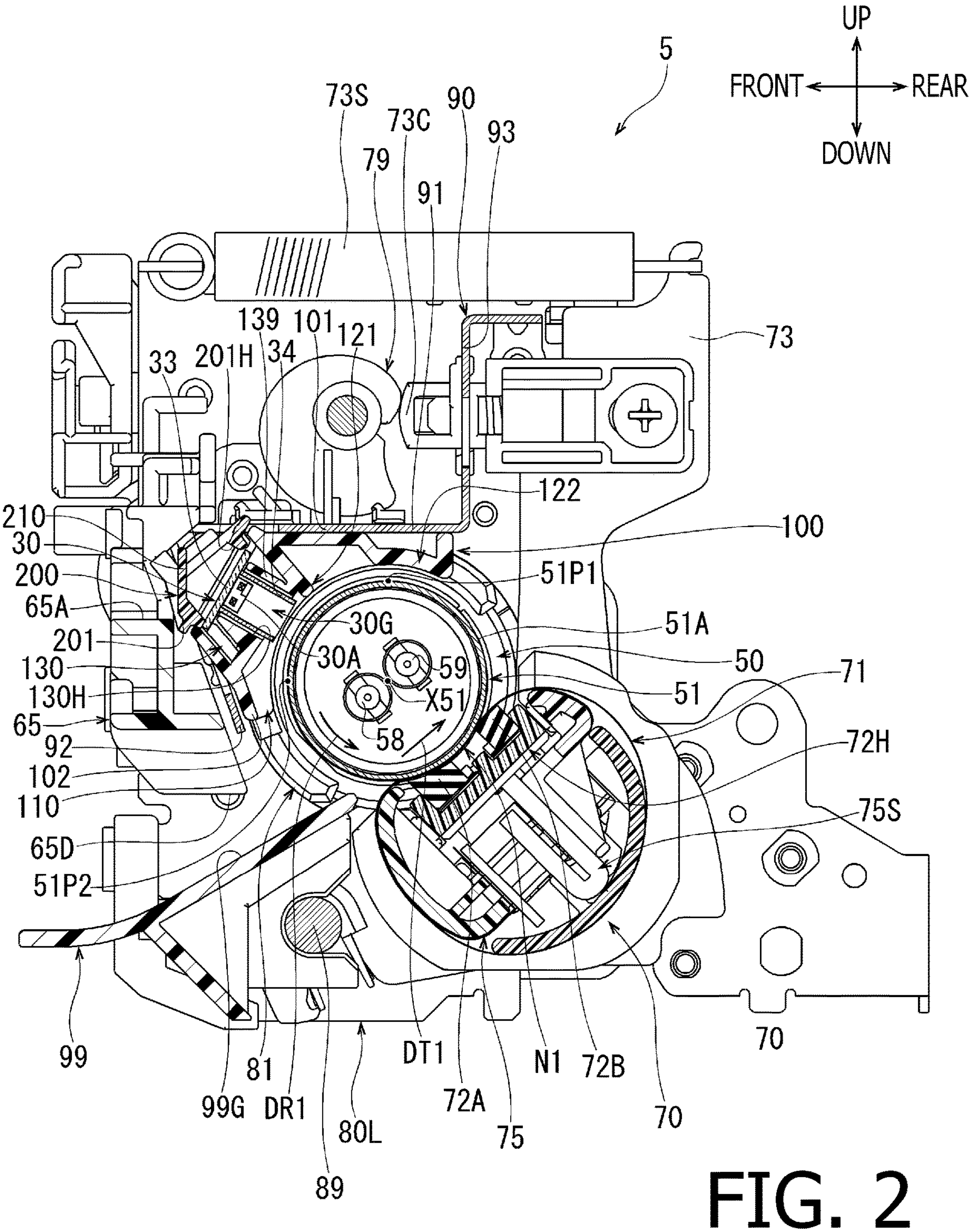
FIG. 2 is a side view of the fuser according to the embodiment of the present disclosure.
Figure 3:
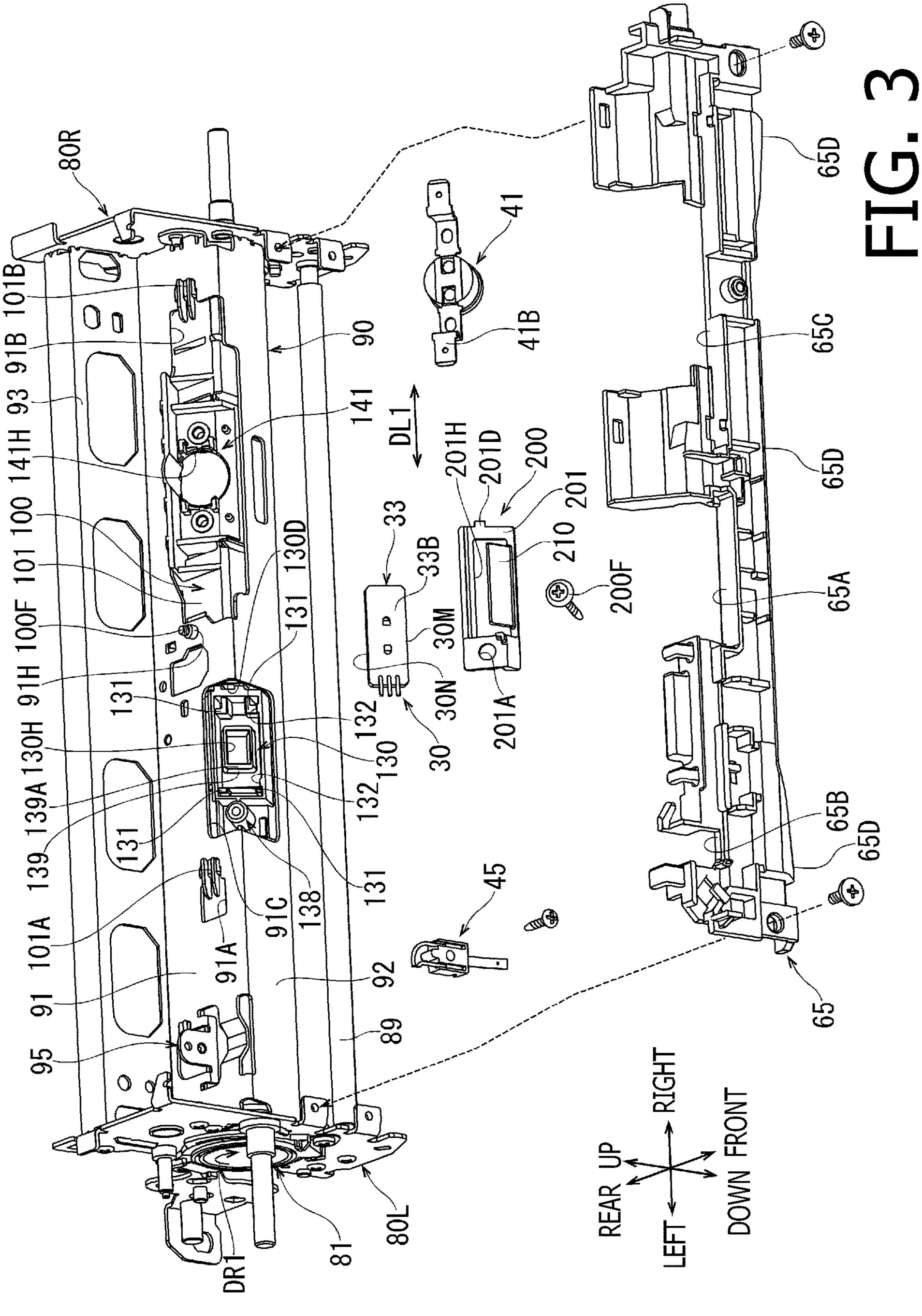
FIG. 3 is a perspective view of a pair of side frames, a connecting frame, and a holder, which are in an assembled condition, and a temperature sensor, a sensor cover, and an upper guide, which are in separated conditions, for the fuser according to the embodiment of the present disclosure.
Figure 4:
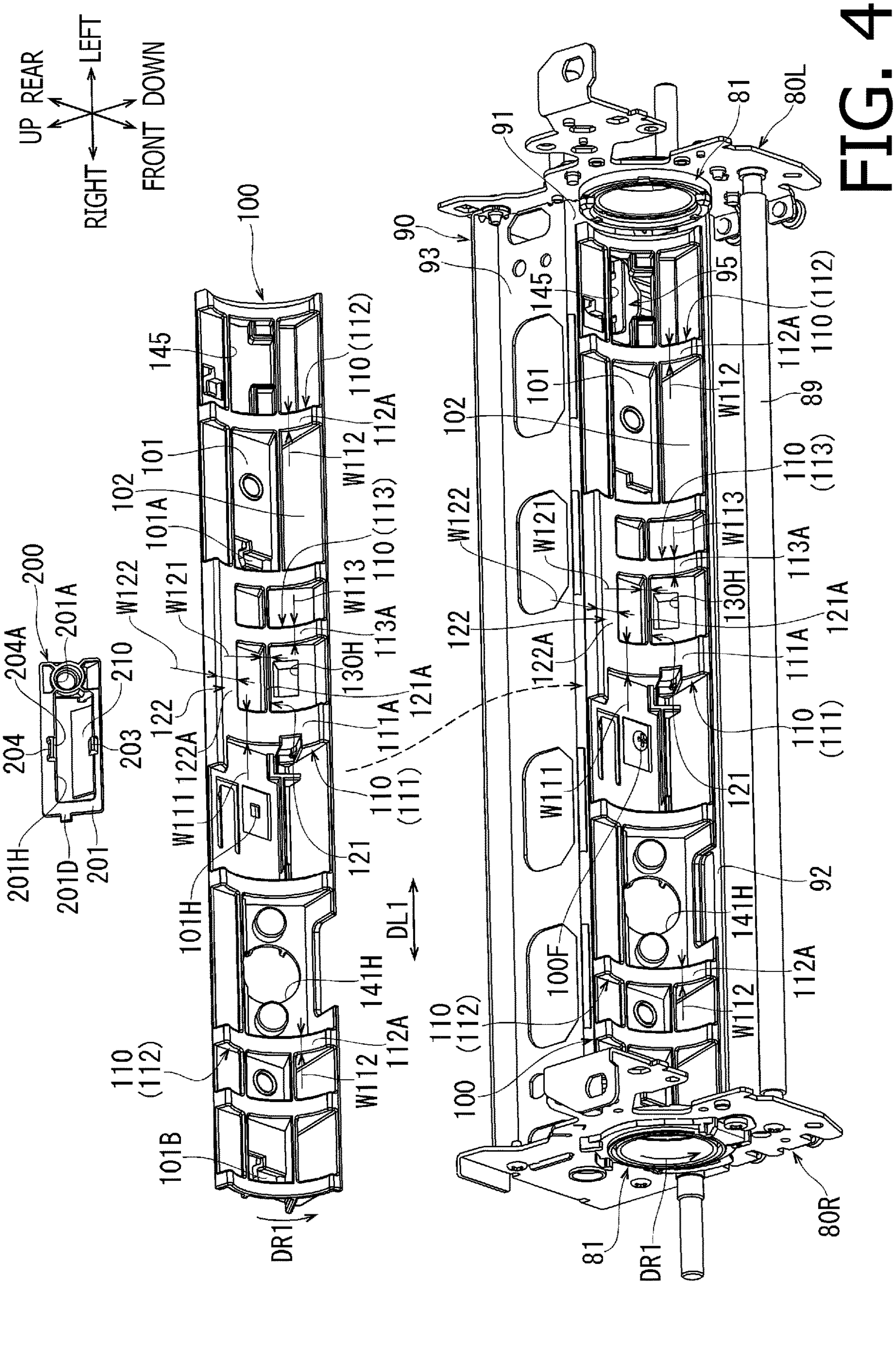
FIG. 4 is a perspective view of the pair of side frames, the connecting frame, and the holder, which are in the assembled condition, and the holder and the sensor cover, which are in separated conditions, for the fuser according to the embodiment of the present disclosure.

As shown in FIGS. 2-4, the fuser 5 includes a supporting member, including a pair of side frames 80L, 80R and a connecting frame 90, to support the heating member 50.

The side frames 80L, 80R and the connecting frames 90 may be pressed-formed or bent-formed metal plates made of, for example, steel.

As shown in FIGS. 3-4, the side frame 80L and the side frame 80R are spaced apart from each other in the crosswise direction and spread in plane in the front-rear direction and the vertical direction. The side frame 80L and the side frame 80R may differ subtly from each other in some points but are generally symmetrical.

At a central area in each of the side frames 80L, 80R, an opening is formed, and a generally ring-formed heat-roller supporting member 81 is fitted therein.

Although not shown in the drawings, the side frame 80L on the left is attached to a frame member, which is arranged on a side face on the left of the main body 2; and the side frame 80R on the right is attached to a frame member, which is arranged on a side face on the right of the main body 2.

As shown in FIG. 3, the connecting frame 90 includes a first plate portion 91, a second plate portion 92, and a third plate portion 93. The first plate portion 91 spreads in the front-rear direction and the crosswise direction substantially in a form of a rectangle. The second plate portion 92 protrudes downward from a frontward end of the first plate portion 91 and extends in the crosswise direction. The third plate portion 93 protrudes upward from a rearward end of the first plate portion 91 and extends in the crosswise direction.

At a crosswise central position in the first plate portion 91 of the connecting frame 90, a screw hole 91H is formed. At a position in the first plate portion 91 leftward apart from the screw hole 91H, an engageable hole 91A is formed.

At a position between the screw hole 91H and the engageable hole 91A in the connecting frame 90, a temperature-sensor opening 91C is formed. The temperature-sensor opening 91C is formed through a frontward part of the first plate portion 91 to a position in vicinity to a lower edge of the second plate portion 92.

At a position rightward apart from the screw hole 91H in the connecting frame 90, a thermostat opening 91B is formed. The thermostat opening 91B is formed through a frontward part of the first plate portion 91 to an upper part of the second plate portion 92.

In a leftward end area in the connecting frame 90, a contact-thermistor retainer 95 is formed. The contact-thermistor retainer 95 may be formed by perforating or cut-and-raising works in the first plate portion 91.

The connecting frame 90 is fastened to the side frame 80L at a leftward end portion thereof and to the side frame 80R at a rightward end portion thereof. Thus, the connecting frame 90 connects the paired side frames 80L, 80R.

Moreover, the side frames 80L, 80R are connected with each other through a pressurizing-member supporting shaft 89, which may be a round rod extending in the crosswise direction, at a lower-frontward position.

As shown in FIG. 2, the heating member 50 includes a heat roller 51. The heat roller 51 may be a hollow rotatable member, which includes a metal-made tube extending in the crosswise direction, an elastic layer formed on a surface of the metal-made tube, and a release layer formed on a surface of the elastic layer. The heat roller 51 is rotatably supported by the side frames 80L, 80R through the heat-roller supporting members 81. The heat roller 1 may rotate, for example, counterclockwise in FIG. 2, about a rotation axis X51, when a driving force from a driving source (not shown) is transmitted thereto.

Figure 5:
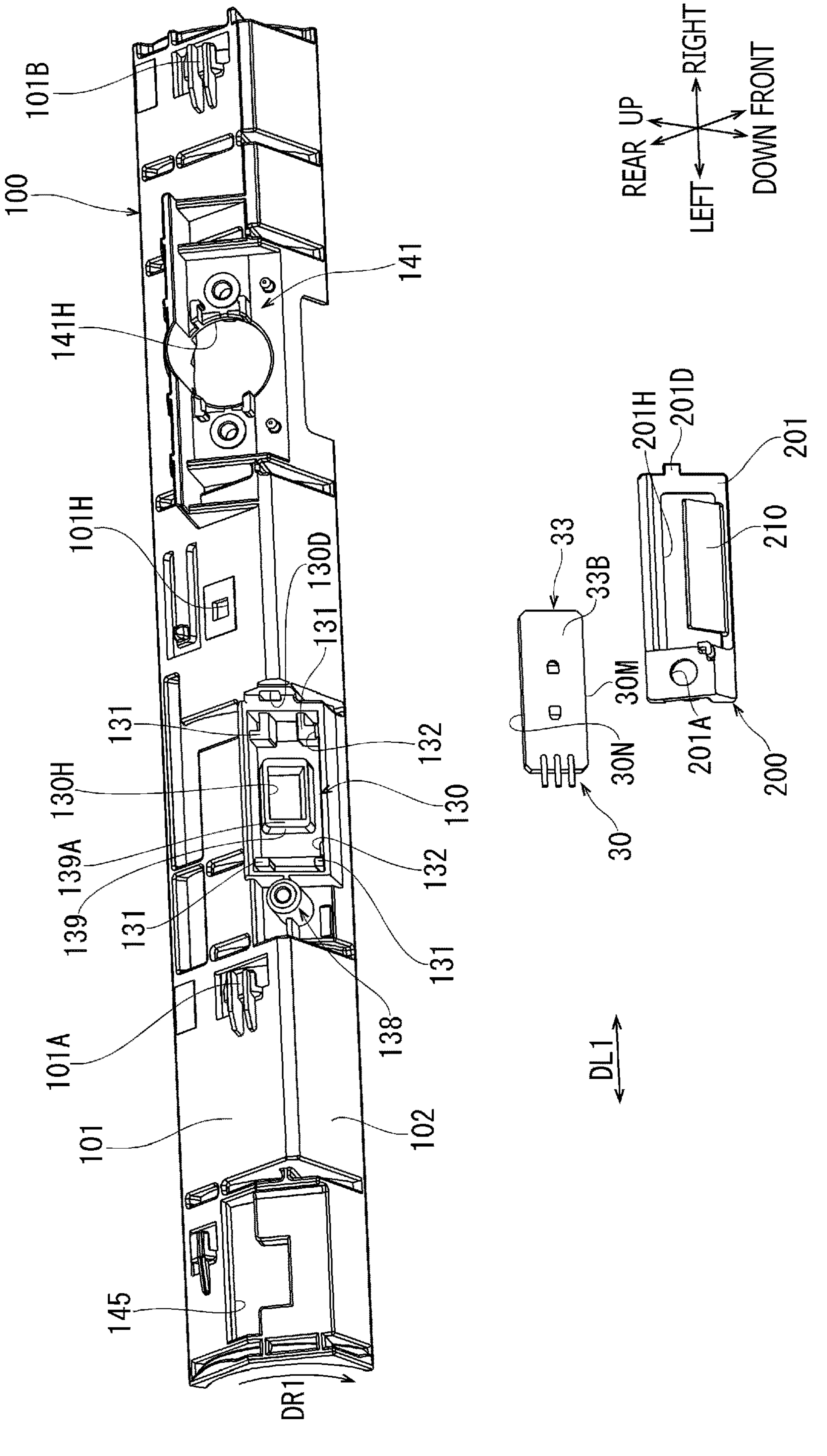
FIG. 5 is a perspective view of the holder, the temperature sensor, and the sensor cover, which are in the separated conditions, for the fuser according to the embodiment of the present disclosure.

The direction, in which the heat roller 51 in the heating member 50 extends, i.e., the crosswise direction, is indicated as a lengthwise direction DL1 in FIGS. 3-5. The direction, in which the heat roller 51 in the heating member 50 rotates, is indicated as a rotating direction DR1 in FIGS. 1-8.

The heating member 70 as shown in FIG. 2 includes an endless belt 71, a pair of swingable members 73, a belt guide 75, and pads 72A, 72B.

The endless belt 71 is a heat-resistant and flexible tubular member made of a sheet of resin such as polyimide or metal such as stainless steel.

The pair of swingable members 73, 73 are metal members formed approximately in a shape of L. The swingable member 73 on the left, which appears on the farther side in FIG. 2, adjoins the side frame 80L. The swingable member 73 on the right, which is not shown but is located on the nearer side in FIG. 2, adjoins the side frame 80R.

The configuration of the swingable member 73 on the right is the same as the configuration of the swingable member 73 on the left; therefore, in the following paragraphs, while the swingable member 73 on the left may be described, illustration and description of the swingable member 73 on the right may be omitted.

The swingable member 73 on the left is swingably supported at a lower end thereof by a leftward end portion of the pressurizing-member supporting shaft 89. The swingable member 73 on the left extends rearward to recede away from the pressurizing-member supporting shaft 89 and curves to extend upward.

At a position between the swingable member 73 on the left and the side frame 80L on the left, a contracting coil spring 73S is arranged. The contracting coil spring 73S is, at one end, connected to an upper end of the swingable member 73 on the left and, at the other end, connected to an upper-frontward corner of the side frame 80L. At a position lower than the contracting coil spring 73S, a cam 79 is arranged and rotatably supported by the side frame 80L. At an upper end position in the swingable member 73 on the left, a cam-contacting portion 73C to contact the cam 79 is arranged to protrude frontward.

The belt guide 75 may include a metal-made enhancing member and resin-made heat-resistant guide member and extends in the crosswise direction. The belt guide 75 is fixed to a hemming-bent stay 75S and is retained by the paired swingable members 73, 73 with crosswise ends of the stay 75S being connected to portions in the swingable members 73, 73 that curve upward. The belt guide 75 is located at a lower and rearward displaced position with respect to the heat roller 51.

At a part of the belt guide 75 that faces the heat roller 51, a pad holder 72H is arranged. The pad holder 72H is fixed to the stay 75S. The pads 72A, 72B are retained by the pad holder 72H. The pads 72A, 72B are heat-resistant elastic pieces, which extend to contact the heat roller 51 throughout the length of the heat roller 51 in the lengthwise direction DL.

The belt guide 75 and the pads 72A, 72B are arranged inside the endless belt 71. The endless belt 71 is rotatable around the belt guide 75 and the pads 72A, 72B.

The pair of swingable members 73, 73 being urged by the contracting coil spring 73S may swing counterclockwise about the pressurizing-member supporting shaft 89; thereby the belt guide 75, the pads 72A, 72B, and the endless belt 71 may approach the heat roller 51, and the pads 72A, 72B may nip the endless belt 71 together with the heat roller 51. Meanwhile, an intensity of pressure from the endless belt 71 against the heat roller 51 may be adjusted by adjusting a rotational position of the cam 79 and having the cam-contacting portion 73C to contact the cam 79 at the adjusted rotational position.

When the sheet SH exiting the process cartridge 7 reaches the fuser 5, the sheet SH may be nipped between the rotating heat roller 51 and the endless belt 71, which is urged against the heat roller 51 and rotated by the rotation of the heat roller 51. Thus, while the heat and the pressure are applied to the sheet SH, the sheet SH may be conveyed to the ejection device 29.

The position, at which the heat roller 51 and the endless belt 71 may nip the sheet SH1, will be herein called as a nipping position N1. The nipping position N1 is lower and rearward with respect to a rotation axis X51 of the heat roller 51. A direction, in which the sheet SH at the nipping position N1 may be conveyed, will be herein called as a conveying direction DT1. The conveying direction DT1 inclines upper-rearward.

The heating member 50 includes a main heater 58 and a sub-heater 59. The main heater 58 and the sub-heater 59 may be halogen heaters and are arranged to extend in the lengthwise direction DL1 inside the heat roller 51. The sub-heater 59 is located at a position downstream from the main heater 58 in the conveying direction DT1.

Crosswise or lengthwise ends of the main heater 58 and crosswise or lengthwise ends of the sub-heater 59 penetrate through the heat-roller supporting members 81, and the main heater 58 and the sub-heater 59 are supported by the side frames 80L, 80R through retainer members, which are not shown. The main heater 58 and the sub-heater 59 may radiate heat to heat the heat roller 51 from inside.

The main heater 58 has heat-generating characteristics such that more heat is generated at a central area than end areas in the lengthwise direction DL1. Meanwhile, the sub-heater 59 has heat-generating characteristics such that more heat is generated at end areas than a central area in the lengthwise direction DL1. In this regard, a central area of the heat roller 51 in the lengthwise direction DL1 may be heated mainly by the main heater 58, and ends areas of the heat roller 51 in the lengthwise direction DL may be heated mainly by the sub-heater 59.

At frontward positions with respect to the fuser 5, a lower guide 99 and an upper guide 65 are arranged. The lower guide 99 and the upper guide 65 may be made of a heat-resistant resin.

The lower guide 99 is located at a frontward position with respect to the endless belt 71. On an upper side of the lower guide 99, a conveyer surface 99G is formed. The conveyer surface 99G inclines upper-rearward toward the nipping position N1. The conveyer surface 99G may direct the sheet SH exiting the process cartridge 7 to the nipping position N1.

As shown in FIG. 3, the upper guide 65 extends in the lengthwise direction DL1, and lengthwise ends of the upper guide 65 are fastened to frontward portions of the side frames 80L, 80R. The upper guide 65 has cutouts 65A, 65B, 65C, which are recessed downward from an upper edge thereof.

The cutout 65A is located at a frontward position with respect to a temperature sensor 30, which will be described further below. The cutout 65B is located at a frontward position with respect to a contact thermistor 45, which will be described further below. The cutout 65C is located at a frontward position with respect to a thermostat 41, which will be described further below.

As shown in FIG. 2, the upper guide 65 is located at a frontward position with respect to the heat roller 51. A lower end 65D of the upper guide 65 is separated above from the conveyer surface 99G. As shown in FIG. 3, the lower end 65D of the upper guide 65 is located to be lower at lengthwise end areas than a lengthwise central area in the lengthwise direction DL1. The lower end 65D of the upper guide 65 may restrict the sheet SH exiting the nipping position N1 from bowing or warping.

<Holder>

As shown in FIGS. 2-8, the fuser 5 has a holder 100. The holder 100 may be made of a heat-resistant resin and, as shown in a separated condition in FIGS. 4-5, extends in the lengthwise direction DL1. The holder 100 includes a first wall 101 and a second wall 102. The first wall 101 is in a form of an approximately rectangular plate, which spreads in the front-rear direction and the crosswise direction. The second wall 102 protrudes downward from a frontward end of the first wall 101 and extends in the crosswise direction.

In a central area in the lengthwise direction DL1 in the first wall 101, a screw hole 101H is formed vertically through the first wall 101.

As shown in FIG. 5, at a position in the first wall 101 on one side of the screw hole 101H in the lengthwise direction DL1, i.e., at a position leftward apart from the screw hole 101H, an engageable claw 101A is formed. At a position in the first wall 101 on the other side of the screw hole 101H in the lengthwise direction DL1, i.e., at a position rightward apart from the screw hole 101H, an engageable claw 101B is formed. The engageable claws 101A, 101B rises upward from an upper surface of the first wall 101 for an amount equivalent to a thickness of the first plate portion 91 and bend to point rightward.

At a position in the holder 100 between the screw hole 101H and the engageable claw 101A, an accommodative dent 130 and a boss 138 are formed. The accommodative dent 130 is formed through a frontward part of the first wall 101 to a lower part of the second wall 102. The boss 138 is located on a leftward side of the accommodative dent 130.

At a position in the holder 100 between the screw hole 101H and the engageable claw 101B, a thermostat retainer 141 is formed. The thermostat retainer 141 is formed through a frontward part of the first wall 101 to an upper part of the second wall 102. At a central position in the thermostat retainer 141, a round hole 141H is formed through the holder 100.

The holder 100 may be attached to the connecting frame 90 in the following procedure. That is, as shown in FIG. 4, the holder 100 may be moved to approach the connecting frame 90 to contact the first plate portion 91 at the first wall 101 from a lower side and contact the second plate portion 92 at the second wall 101 from a rear side.

Next, as shown in FIG. 3, the engageable claw 101A may be engaged with an edge of the engageable hole 91A on the right in the connecting frame 90, and the engageable claw 101B may be engaged with an edge of the thermostat opening 91B on the right in the connecting frame 90.

Thereafter, as shown in FIG. 4, a screw 100F may be inserted in the screw hold 101H in the holder 100 from the lower side and, as shown in FIG. 3, screwed in the screw hold 91H in the connecting frame 90.

Thus, the holder 100 may be attached to the connecting frame 90 by being fastened to the connecting frame 90 at the central area in the lengthwise direction DL1 and engaged with the connecting frame 90 at positions on one side and the other side of the central area in the lengthwise direction DL1 apart from the central area.

In this arrangement, in the holder 100, the accommodative dent 130 and the boss 138 are exposed through the temperature-sensor opening 91C in the connecting frame 90, and the thermostat retainer 141 is exposed through the thermostat opening 91B.

Figure 6:
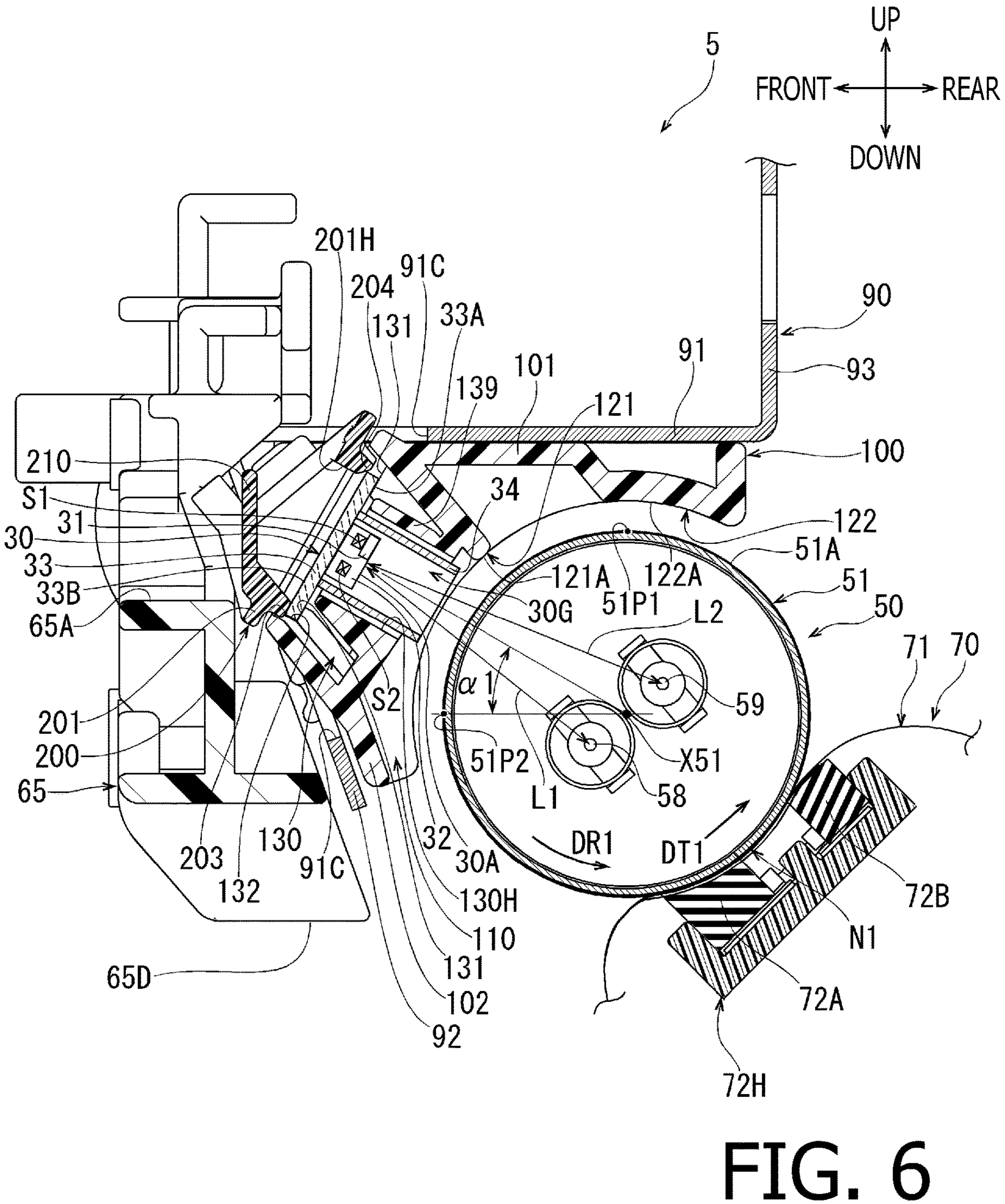
FIG. 6 is a cross-sectional partial view of the fuser, including a cross section of a temperature sensor, according to the embodiment of the present disclosure.
Figure 7:
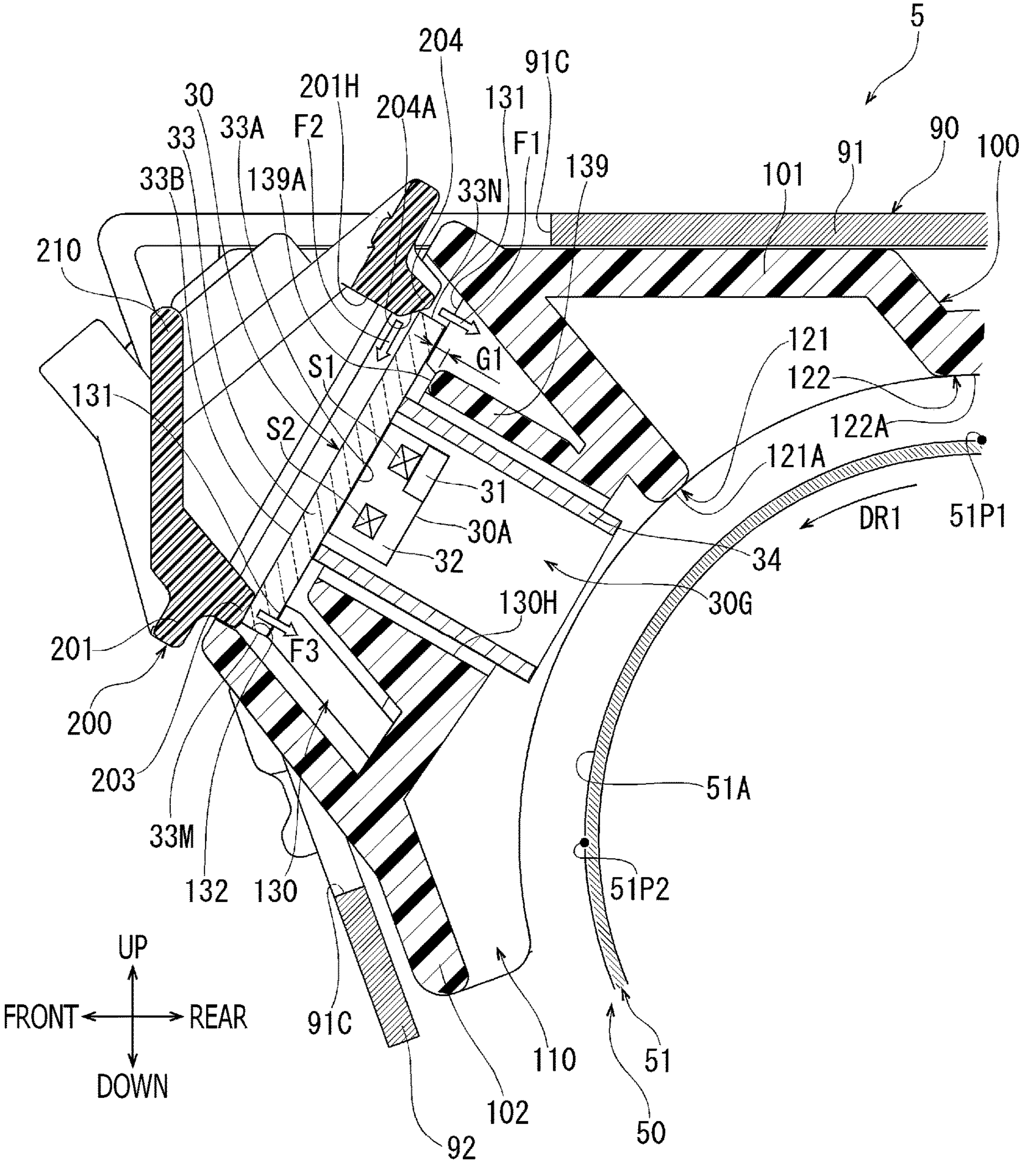
FIG. 7 is an enlarged partial view of the fuser, including the cross section of the temperature sensor, according to the embodiment of the present disclosure.

As shown in FIGS. 5-7, the accommodative dent 130 is located at an upper-frontward position apart from the rotation axis X51 of the heat roller 51. The accommodative dent 130 is an approximately rectangular recessed portion, which is open upper-frontward and dented lower-rearward toward the heat roller 51. At a central area in a bottom part of the accommodative recessed portion 130, a detection hole 130H, which may be in a rectangular form, and a protector wall 139, which may be a four-sided vertically open box or a tubular frame surrounding the detection hole 130, are formed.

At each of four (4) corners of the accommodative recessed portion 130, a first contact portion 131 is formed. The first contact portion 131 is a face of a piece, which faces upper-rearward and is located at a position apart farther upper-rearward than the bottom of the accommodative recessed portion 130 from the heat roller 51. The four (4) first contact portions 131 align with one another on a same plane.

On an inner surface of the accommodative recessed portion 130 on a lower side, two (2) ribs are formed, and on each end of the ribs farther from the heat roller 51, a second contact portion 132 is formed. The second contact portions 132 are end faces of the ribs, which face upper-rearward and adjoin two (2) of the first contact portions 131 on the lower side at positions farther than the two (2) first contact portions 131 from the heat roller 51. The second contact portions 132 align on a same plane and intersect orthogonally with the first contact portions 131.

As shown in FIG. 5, at a position in the holder 100 rightward from the accommodative recessed portion 130, a fit-in recessed portion 130D recessed rightward is formed.

As shown in FIG. 4, on a face of the holder 100 facing toward the heat roller 51, a plurality of ribs 110, a first enhancing rib 121, and a second enhancing rib 122 are formed integrally. The ribs 110, the first enhancing rib 121, and the second enhancing rib 122 will be described later in detail.

<Sensor Cover>

As shown in FIGS. 2-7, the fuser 5 has a sensor cover 200. The sensor cover 200 may be made of a heat-resistant resin. The sensor cover 200 includes a base 201 and a windshield wall 210 formed in adjacent to the base 201.

As shown in FIGS. 4-5, the base 201 is in a form of an approximately rectangular frame having a rectangular opening 201H. An upper edge and a lower edge of the base 201 extend in the lengthwise direction DL1. A leftward edge of the base 201 extends between a leftward end of the upper edge and a leftward end of the lower edge. A rightward edge of the base 201 extends between a rightward end of the upper edge and a rightward end of the lower edge.

On the rightward edge of the base 201, a fit-in protrusive portion 201D protruding rightward is formed. On a leftward part of the base 201, a screw opening 201A is formed.

The windshield wall 210 is connected to the lower edge of the base 201. The windshield wall 210 protrudes upright along the vertical direction and longitudinally extends in the lengthwise direction DL1 in a form of a rectangular plate.

The sensor cover 200 may be attached to the holder 100 in the following procedure. That is, the four (4) edges of the sensor cover 200 may be placed to fit with the edges of the accommodative recessed portion 130 in the holder 100, the fit-in protrusive portion 210D may be inserted in the fit-in recessed portion 130D which is on the rightward side of the accommodative recessed portion 130, and a screw 200 as shown in FIG. 3 may be inserted through the screw opening 201A and screwed into a threaded hole formed in the boss 138 in the holder 100. Thus, the sensor cover 200 may be attached to the holder 100 on a side of the heat roller 51 opposite to the accommodative recessed portion 130.

As shown in FIGS. 4 and 7, the base 201 of the sensor cover 200 includes a third contact portion 203 and a fourth contact portion 204. The third contact portion 203 and the fourth contact portion 204 are located on a surface of the base 201 that faces toward the heat roller 51.

The third contact portion 203 is located at a center of the lower edge of the base 201 in the lengthwise direction DL1. The third contact portion 203 is a protrusion protruding toward the heat roller 51 and longitudinally extending in the lengthwise direction DL for a small length relatively to the length of the lower edge.

The fourth contact portion 204 is located at a center of the upper edge of the base 201 in the lengthwise direction DL1. The fourth contact portion 204 is a protrusion protruding toward the heat roller 51 and longitudinally extending in the lengthwise direction DL1 for a small length relatively to the length of the upper edge.

As shown in FIG. 7, in the condition where the sensor cover 200 is attached to the holder 100, an end face of the third contact portion 203 spreads in parallel with the first contact portions 131 in the accommodative recessed portion 130 and is separated from the first contact portions 131 for an amount equivalent to a thickness of a sensor board 33, which will be described further below.

The fourth contact portion 204 has an oblique face 204A. In the condition where the sensor cover 200 is attached to the holder 100, the oblique face 204A inclines with respect to the first contact portions 131 in the accommodative recessed portion 130 and longitudinally extends in the lengthwise direction DL1.

<Temperature Sensor>

As shown in FIGS. 2, 3, 6, and 7, the fuser 5 includes a temperature sensor 30. The temperature sensor 30 may detect a temperature of the heat roller 51 without contacting. A detected result from the temperature sensor 30 may be mainly used to control the temperature in the main heater 58.

As shown in FIG. 7, the temperature sensor 30 includes the sensor board 33, a light-guiding frame 34, an absorber 31, a retainer 32, a temperature-detecting thermistor S1, and a temperature-compensating thermistor S2.

The sensor board 33 is a circuit board having a form of a rectangular plate, as shown in FIG. 5, which fits with the accommodative recessed portion 130. As shown in FIG. 7, the sensor board 33 has a first face 33A and a second face 33B on one side and the other side, respectively.

The first face 33A of the sensor board 33 faces toward the heat roller 51. The second face 33B of the sensor board 33 is on the other side, facing reversely from the first face 33A. In other words, the second face 33B faces away from the heat roller 51.

The sensor board 33 is accommodated in the accommodative recessed portion 130 in an arrangement such that the first face 33A contacts the first contact portions 131 in the accommodative recessed portions 130 at four (4) corners thereof. In this arrangement, a first end face 33M, which is a lower face of the sensor board 33 located on one end in the rotating direction DR1 and extends longitudinally in the lengthwise direction DL1, contacts the second contact portions 132. Meanwhile, a second end face 33N of the sensor board 33, which is located at the other end in the rotating direction DR1, is an upper face of the sensor board 33 extending in the lengthwise direction DL1.

As the sensor cover 200 is being attached to the holder 100, the fourth contact portion 204 in the sensor cover 200, in particular, the oblique face 204A, may contact the sensor board 33 at a position on an edge of the second end face 33N on a side of the second face 33B. The oblique face 204A extends along the second end face 33N of the sensor board 33 and contacts the second end face 33N in a posture inclining with respect to the second end face 33N of the sensor board 33. In particular, the fourth contact portion 204 may contact the edge of the second end face 33N of the sensor board 33 at a center of the sensor board 33 in the lengthwise direction DL1.

In this condition, the fourth contact portion 204 may generate a force F1, which may urge the sensor board 33 at the edge of the second end face 33N against the upper two (2) of the first contact portions 131, and a force F2, which may shift the sensor board 33 toward the two second contact portions 132.

Meanwhile, as the sensor cover 200 is being attached to the holder 100, the third contact portion 203 in the sensor cover 200, in particular, the end face of the third contact portion 203, may contact the sensor board 33 at a position on an edge of the first end face 33M on a side of the second face 33B. The third contact portion 203 may contact the edge of the first end face 33M of the sensor board 33 at a center of the censor board 33 in the lengthwise direction DL1.

In this condition, the third contact portion 203 may generate a force F3, which may urge the sensor board 33 at the edge of the first end face 33M against the lower two (2) of the first contact portions 131.

Thus, the sensor board 33 may be retained by the four (4) first contact portions 131, the two (2) second contact portions 132, the third contact portion 203, and the fourth contact portion 204 in the accommodative recessed portion 130 in the holder 100.

Therefore, the temperature sensor 30 may be accommodated in the accommodative recessed portion 130 in the holder 100 at the correct position in the direction, in which the heat roller 51 and the temperature sensor 30 face each other, and in the rotating direction DR1 for the heat roller 51. The temperature sensor 30 may be attached to the connecting frame 90 through the holder 100 attached to the connecting frame 90.

In the condition where the temperature sensor 30 is accommodated in the accommodative recessed portion 130, the sensor cover 200 is located on the side of the temperature sensor 30 opposite to the heat roller 51 and covers the temperature sensor 30 by the base 201. The sensor cover 200 is open upward through the opening 201H. The windshield wall 210 in the sensor cover 200 is located frontward with respect to the opening 201H and the temperature sensor 30. The windshield wall 210 protrudes upright along the vertical direction and longitudinally extends in the lengthwise direction DL1. A vertical position of an upper end of the windshield wall 210 may be substantially equal to a vertical position of an upper edge of the opening 201H.

With the windshield wall 210 in the sensor cover 200, the air current around the fuser 5 may be restrained from reaching the temperature sensor 30. Moreover, the heated air around the temperature sensor 30 may be discharged through the opening 201H, and the temperature sensor 30 may be restrained from detecting higher temperatures.

To the sensor board 33, the light-guiding frame 34 is fixed on the first face 33A. The light-guiding frame 34 may be a metal frame having four (4) sides standing in a direction orthogonal to the first face 33A toward the heat roller 51.

The absorber 31 may be, for example, a piece of red-colored film or copper foil that may absorb infrared rays from the heat roller 51. The absorber 31 is retained by the retainer 32. While the retainer 32 may be illustrated in a simplified form in the accompanying drawings, for example in FIG. 7, the retainer 32 may include a resin member and a polyimide resin film: the resin member may be adhered to the first face 33A of the sensor board 33 on one side; and to the other side of the resin member facing toward the heat roller 51, the polyimide resin film may be adhered. The absorber 31 may be bonded or adhered to the polyimide resin film in the retainer 32 to be retained by the retainer 32 through the polyimide resin film.

The retainer 32 retaining the absorber 31, the temperature-detecting thermistor S1, and the temperature-compensating thermistor S2 are arranged in an area enclosed by the light-guiding frame 34 on the first face 33A of the sensor board 33. It may be noted, in the accompanying drawings, for example in FIG. 7, the temperature-detecting thermistor S1 and the temperature-compensating thermistor S2 may appear to be located along a circumferential direction of the rotation axis X51 for a purpose of easier explanation; however, the temperature-detecting thermistor S1 and the temperature-compensating thermistor S2 in the fuser 5 according to the present embodiment should be arranged along side by side along the rotation axis X51.

A face of the absorber 31 that faces the heat roller 51 and a face of the polyimide resin film of the retainer 32 that faces the heat roller 51 form the detectable face 30A of the temperature sensor 30.

The temperature-detecting thermistor S1 is retained by the retainer 32 on one side of the polyimide resin film facing toward the sensor board 33 at a position, in which the absorber 31 is adhered to the other side of the polyimide resin film. The resin member in the retainer 32 is recessed to accommodate the temperature-detecting thermistor S1. The temperature-detecting thermistor S1 may detect a temperature of the absorber 31 through the polyimide resin film in the retainer 32.

The temperature-compensating thermistor S2 is retained by the retainer 32 on the one side of the polyimide resin film facing toward the sensor board 33 at a position, in which the absorber 31 is not adhered to the other side of the polyimide resin film. The resin member in the retainer 32 is recessed to accommodate the temperature-compensating thermistor S2. The temperature-compensating thermistor S2 may detect a temperature of the polyimide resin film in the retainer 32.

The light-guiding frame 34 has inner faces defining a light-guiding path 30G, in which the infrared rays from the heat roller 51 may be guided to the detectable face 30A of the temperature sensor 30.

The protector wall 139 in the accommodative recessed portion 130 is formed between the sensor board 33 and the heat roller 51. The protector wall 139 extends along the light-guiding path 30G to surround the light-guiding frame 34.

Between the sensor board 33 and an edge 139A of the protector wall 139 that faces the sensor board 33, a gap G1 is formed. The gap G1 is reserved to keep the edge 139A of the protector wall 139 off from the first face 33A of the sensor board 33 and restrain the heat from being transferred from the protector wall 139 to the sensor board 33. An amount of the gap G1 may be, for example, 1-3 mm.

Based on a difference in the temperatures between the absorber 31 and the retainer 32 with reference to detected results from the temperature-detecting thermistor S1 and the temperature-compensating thermistor S2, the temperature sensor 30 may measure an intensity of infrared energy from the heat roller 51 and detect the temperature of the heat roller 51 without contacting.

<Positional Relation among the Temperature Sensor, the Heat Roller, the Main Heater, and the Sub-Heater at a Cross Section Orthogonal to the Lengthwise Direction>

As shown in FIG. 6, at a cross section spreading orthogonally to the lengthwise direction DL1, a first peak 51P1 is a highest point in an outer circumferential surface 51A of the heat roller 51. Meanwhile, a second peak 51P2 is a most frontward point in the outer circumferential surface 51A of the heat roller 51. A part of the outer circumferential surface 51A of the heat roller 51, at which the detectable face 30A of the temperature sensor 30 faces the heat roller 51, is located within a range on the outer circumferential surface 51A of the heat roller 51 between the first peak 51P1 and the second peak 51P2.

For example, an angle $\alpha 1$ between a line extending from the rotation axis X51 of the heat roller 51 to the detectable face 30A of the temperature sensor 30 and a line extending horizontally frontward from the rotation axis X51 of the heat roller 51 may be 30 degrees. While the sheet SH nipped at the nipping position N1 between the heat roller 51 and the endless belt 71 may curl or flip and cause the toner on the sheet SH to scatter in the air in an upstream area in the conveying direction from the nipping position N1, and the scattered toner may affect the sensing accuracy of the temperature sensor 30, the angle of 30 degrees may be considered to restrain the influence of the scattered toner on the temperature sensor 30.

At the cross section spreading orthogonally to the lengthwise direction DL1, a first distance L1 between the detectable face 30A of the temperature sensor 30 and the main heater 58 is shorter than a second distance L2 between the detectable face 30A of the temperature sensor 30 and the sub-heater 59. Therefore, while the temperature sensor 30 may be affected by the heat convection occurring in the area around the heat roller 51 to a smaller extent, detected results from the temperature-detecting thermistor S1 and the temperature-compensating thermistor S2 may be restrained from fluctuating, or the temperature sensor 30 may be restrained from detecting higher temperatures.

<Contact Thermistor>

As shown in FIG. 3, the fuser 5 includes a contact thermistor 45. The contact thermistor 45 is retained by the cut-and-raised portion of the contact-thermistor retainer 95 in the connecting frame 90 and extends downward through an opening formed by the cut-and-raising. Although not shown in the drawings, the contact thermistor 45 may contact the outer circumferential surface 51A of the heat roller 51 and detect the temperature of the heat roller 51. Detected results from the contact thermistor 45 may be used mainly to control the temperature in the sub-heater 59.

<Thermostat>

Figure 8:
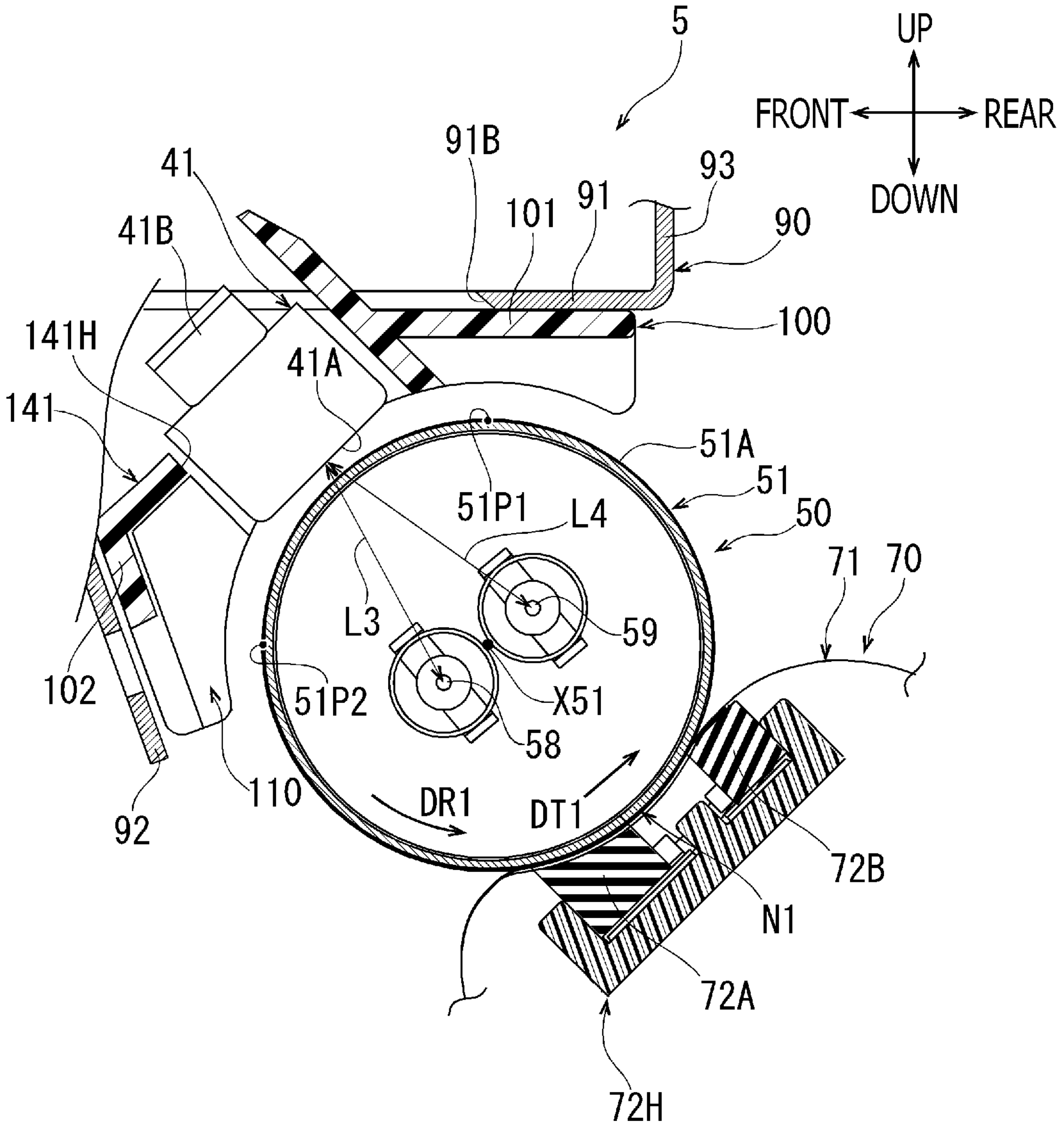
FIG. 8 is a cross-sectional partial view of the fuser, including a cross section of a thermostat, according to the embodiment of the present disclosure.

As shown in FIGS. 3 and 8, the fuser 5 includes a thermostat 41. The thermostat 41 is fitted in the round hole 141H in the thermostat retainer 141 and fastened to the thermostat retainer 141 with a screw through a bracket 41B to be retained by the holder 100. Therefore, in the condition where the holder 100 is attached to the connecting frame 90, the thermostat 41 is attached to the connecting frame 90 through the holder 100.

As shown in FIG. 8, a detectable face 41A of the thermostat 41 faces the outer circumferential surface 51A of the heat roller 51. The thermostat 41 may, when the temperature of the heating member 50 exceeds an upper limit value, cut off power supply to the main heater 58 and the sub-heater 59.

At a cross section spreading orthogonally to the lengthwise direction DL1, a third distance L3 between the detectable face 41A of the thermostat 41 and the main heater 58 is equal to a fourth distance L4 between the detectable face 41A of the thermostat 41 and the sub-heater 59. In this arrangement, when either one of the main heater 58 and the sub-heater 59 excessively heats up, the thermostat 41 may cut off the power supply to the main heater 58 and the sub-heater 59 reliably.

<Ribs, First Enhancing Rib, and Second Enhancing Rib>

As shown in FIG. 4, the plurality of ribs 110, the first enhancing rib 121, and the second enhancing rib 122 are formed integrally in the holder 100. Therefore, in the condition where the holder 100 is attached to the connecting frame 90, the plurality of ribs 110, the first enhancing rib 121, and the second enhancing rib 122 are provided in the connecting frame 90.

The plurality of ribs 110 are located at positions different from the detecting hole 130H in the accommodative recessed portion 130, in other words, positions different from the temperature-detecting thermistor S1 and the temperature-compensating thermistor S1 in the temperature sensor 30, in the lengthwise direction DL1.

As shown in FIGS. 4 and 6, the plurality of ribs 110 are connected to the first wall 101 and the second wall 102, protruding toward the heat roller 51, and extending in the rotating direction DR1 along the outer circumferential surface of the heat roller 51. The plurality of ribs 110 extend from a rear end of the first wall 101 to a lower end of the second wall 102.

As shown in FIG. 6, upper-rearward ends of the plurality of ribs 110 are located rearward with respect to the first peak 51P1 of the outer circumferential surface 51A of the heat roller 51, and lower-frontward ends of the plurality of ribs 110 are located to be lower than the second peak 51P2 of the outer circumferential surface 51A of the heat roller 51.

Faces of the ribs 110 facing the outer circumferential surface 51A of the heat roller 51 are curved in arcs which are centered about the rotation axis X51 of the heat roller 51.

A distance between the faces of the ribs 110 facing the outer circumferential surface 51A of the heat roller 51 and the outer circumferential surface 51A of the heat roller 51 is substantially small to an extent such that the ribs 110 and the heat roller 51 should not contact each other.

As shown in FIG. 4, the plurality of ribs 110 includes a first rib 111, a second rib 112, and a third rib 113.

The first rib 111 is located at a position apart rightward from the detecting hole 130H in the accommodative recessed portion 130, in other words, from the temperature-detecting thermistor S1 and the temperature-compensating thermistor S2 in the temperature sensor 30, in the lengthwise direction DL1.

The third rib 113 is located at a position apart leftward from the detecting hole 130H in the accommodative recessed portion 130, in other words, from the temperature-detecting thermistor S1 and the temperature-compensating thermistor S2 in the temperature sensor 30, in the lengthwise direction DL1. In other words, the third rib 113 is located on a side of the temperature-detecting thermistor S1 and the temperature-compensating thermistor S2 opposite to the first rib 111 in the lengthwise direction DL1.

The second rib 112 includes a plurality of second ribs 112, some of which are located apart rightward from the first rib 111 and some other of which are located apart leftward from the third rib 113, in the lengthwise direction DL1. In other words, the second ribs 112 are located at positions apart farther than the first rib 111 and than the third rib 113 from the temperature-detecting thermistor S1 and the temperature-compensating thermistor S2 in the temperature sensor 30 in the lengthwise direction DLL Hereinafter, a dimension of a face 111A of the first rib 111 facing the outer circumferential surface MA of the heat roller 51 in the lengthwise direction DL1 will be called as a width W111. A dimension of a face 112A of each second rib 112 facing the outer circumferential surface MA of the heat roller 51 in the lengthwise direction DL1 will be called as a width W112. A dimension of a face 113A of the third rib 113 facing the outer circumferential surface MA of the heat roller 51 in the lengthwise direction DL1 will be called as a width W113.

The width W111 is greater than the width W112 and is greater than the width W113. In this arrangement, the air around the temperature sensor 30 may be restrained from flowing in the lengthwise direction DL1 effectively compared to a hypothetical configuration, in which widths of the faces of the ribs 110 facing the outer circumferential surface 51A of the heat roller 51 are equal. Therefore, the detected results from the temperature-detecting thermistor S1 and the temperature-compensating thermistor S2 may be restrained from deviating more effectively. In the present embodiment, the width W112 and the width W113 are substantially equal. The width W111, at a position indicated by a dimension line in FIG. 4, may be larger than or equal to twice of the width W112, W113. Meanwhile, at some positions recessed from the position indicated by the dimension line in FIG. 4, the width W111 may be 1.5 times as large as the width W112, 113 or larger. Optionally, the width W113 may be larger than the width W112.

As shown in FIGS. 4 and 6, the first enhancing rib 121 is connected to the first wall 101 of the holder 100, protruding toward the heat roller 51, and extending in the lengthwise direction DL1 to be connected to the first rib 111 and the third rib 113 at ends thereof in the lengthwise direction DL1. As shown in FIG. 6, a part of the first enhancing rib 121 may serve to define the accommodative recessed portion 130.

As shown in FIGS. 4 and 6, the second enhancing rib 122 is connected to the first wall 101 of the holder 100, protruding toward the heat roller 51, and extending in the lengthwise direction DL1 to be connected to an upper-rearward end of the first rib 111 and an upper-rearward end of the third rib 113.

As shown in FIG. 6, the first enhancing rib 121 is located at a position different in the rotating direction DR1 from the temperature-detecting thermistor S1 and the temperature-compensating thermistor S2 in the temperature sensor 30.

In particular, the first enhancing rib 121 is located at a position upstream from the temperature-detecting thermistor S1 and the temperature-compensating thermistor S2 in the temperature sensor 30 in the rotating direction DR1. In other words, the first enhancing rib 121 is closer to the first peak 51P1 of the heat roller 51 than the temperature-detecting thermistor S1 and the temperature-compensating thermistor S2 in the temperature sensor 30.

The second enhancing rib 122 is located on the side opposite to the temperature-detecting thermistor S1 and the temperature-compensating thermistor S2 in the temperature sensor 30 across the first enhancing rib 121 in the rotating direction DR1.

In particular, the second rib 122 is located at a position upstream from the first enhancing rib 121 in the rotating direction DR1. In other words, the second enhancing rib 122 is closer to the first peak 51P1 of the heat roller 51 than the first enhancing rib 121 in the rotating direction DR1.

A distance between the face of the first enhancing rib 121 facing the outer circumferential surface 51A of the heat roller 51 and the outer circumferential surface 51A of the heat roller 51 is substantially small to an extent such that the first enhancing rib 121 and the heat roller 51 should not contact each other. A distance between the face of the second enhancing rib 122 facing the outer circumferential surface MA of the heat roller 51 and the outer circumferential surface 51A of the heat roller 51 is substantially small to an extent such that the second enhancing rib 122 and the heat roller 51 should not contact each other.

Hereinafter, as shown in FIG. 4, a dimension of a face 121A of the first enhancing rib 121 facing the outer circumferential surface MA of the heat roller 51 in the rotating direction DR1 will be called as a width W121. A dimension of a face 122A of the second enhancing rib 122 facing the outer circumferential surface MA of the heat roller 51 in the rotating direction DR1 will be called as a width W122.

The width W122 is greater than the width W121. In this arrangement, the air around the temperature sensor 30 may be restrained from flowing in the rotating direction DR1 by the first enhancing rib 121 and the second enhancing rib 122 having the greater width than the first enhancing rib 121 more effectively. In the present embodiment, the width 122 is larger than or equal to twice of the width W121.

Additionally, the holder 100 may have an enhancing rib that connects two (2) adjoining second ribs 122 and an enhancing rib that connects two (2) adjoining third ribs 113.

<Benefits>

In the fuser 5 according to the embodiment described above, as shown in FIG. 4, the plurality of ribs 110, including the first rib 111 and the second rib 112, are located at positions different in the lengthwise direction DL1 of the heating member 50 from the detection hole 130H, i.e., from the temperature-detecting thermistor S1 and the temperature-compensating thermistor S2.

Meanwhile, the width W111 of the face 111A of the first rib 111 facing the outer circumferential surface MA of the heat roller 51 is greater than the width W112 of the face 112B of the second rib 112 facing the outer circumferential surface 51A of the heat roller 51.

Therefore, compared to the hypothetical configuration, in which widths of the faces of the ribs 110 facing the outer circumferential surface 51A of the heat roller 51 are equal, the air around the temperature sensor 30 may be restrained from flowing in the lengthwise direction DL1 effectively, and the detected results from the temperature-detecting thermistor S1 and the temperature-compensating thermistor S2 may be restrained from deviating.

Thus, according to the fuser 5 of the present embodiment, the sensing accuracy of the temperature sensor 30 may be improved.

Moreover, according to the fuser 5 of the present embodiment, the third rib 113 is located on the side of the detection hole 130, i.e., the temperature-detecting thermistor S1 and the temperature-compensating thermistor S2 in the temperature sensor 30, opposite to the first rib 111 in the lengthwise direction DL1. With the third rib 113 in this arrangement, the air around the temperature sensor 30 may be restrained from flowing in the lengthwise direction DL1 effectively. Therefore, the sensing accuracy of the temperature sensor 30 may be improved more reliably.

Moreover, according to the fuser 5 of the present embodiment, as shown in FIG. 6, the first enhancing rib 121 is located at the position different in the rotating direction DR1 from the temperature-detecting thermistor S1 and the temperature-compensating thermistor S2 in the temperature sensor 30. With the first enhancing rib 121 in this arrangement, the air around the temperature sensor 30 may be restrained from flowing in the rotating direction DR1. Therefore, the sensing accuracy of the temperature sensor 30 may be improved more reliably.

Moreover, in the fuser 5 according to the present embodiment, the second enhancing rib 122 is located on the side opposite to the temperature-detecting thermistor S1 and the temperature-compensating thermistor S2 in the temperature sensor 30 across the first enhancing rib 121 in the rotating direction DR1. The first enhancing rib 121 is located at the position upstream from the temperature sensor 30 in the rotating direction DR1. The second rib 122 is located at the position upstream from the first enhancing rib 121 in the rotating direction DR1. Meanwhile, the width W122 of the face 122A of the second enhancing rib 122 facing the outer circumferential surface 51A of the heat roller 51 in the rotating direction DR1 is greater than the width W121 of the face 121A of the first enhancing rib 121 facing the outer circumferential surface 51A of the heat roller 51 in the rotating direction DR1. With the first enhancing rib 121 and the second enhancing rib 122 in this arrangement, the air around the temperature sensor 30 may be restrained from flowing in the rotating direction DR1 more effectively.

Therefore, the sensing accuracy of the temperature sensor 30 may be improved more reliably.

Moreover, the fuser 5 according to the present embodiment includes, as shown in FIGS. 3 and 4, the pair of side frames 80L, 80R, the connecting frame 90, and the holder 100 to support the heating member 50. The holder 100, which is attached to the connecting frame 90 and retains the temperature sensor 30, is formed integrally with the plurality of ribs 110. In this arrangement, the temperature sensor 30 and the plurality of ribs 110 may be attached to the connecting frame 90 in easy manufacturing operations.

Moreover, in the fuser 5 according to the present embodiment, as shown in FIG. 3, the holder 100 is fastened to the connecting frame 90 at the screw hole 91H formed in the central area in the lengthwise direction DL1 by the screw 100F. Further, the holder 100 is engageable with the connecting frame 90 by the engagement between the engageable claws 101A, 101B, which may be engaged with the edge of the engageable hole 91A on the right and the edge of the thermostat opening 91B on the right, respectively, formed in the connecting frame 90 at the separated positions on the one side and the other side of the center of the connecting frame 90 in the lengthwise direction DL1. In this arrangement, the holder 100 may be attached to the connecting frame 90 in easy manufacturing operations.

Moreover, in the fuser 5 according to the present embodiment, as shown in FIG. 7, the temperature sensor 30 includes the absorber 31, the retainer 32, the temperature-detecting thermistor S1, the temperature-compensating thermistor S2, and the sensor board 33. The protector wall 139 in the holder 100 is located between the sensor board 33 and the heat roller 51 and extends along the light-guide path 30G to surround the light-guide path 30G. Meanwhile, the gap G1 is formed between the sensor board 33 and the edge 139A of the protector wall 139 that faces the sensor board 33. The gap G1 may restrain the heat from the heat roller 51 from being transferred to the temperature-detecting thermistor S1 or the temperature-compensating thermistor S2 through the holder 100 and the protector wall 139. Therefore, the sensing accuracy of the temperature sensor 30 may be improved more reliably.

Moreover, in the fuser 5 according to the present embodiment, as shown in FIG. 6, the heating member 50 has the heat roller 51 while the pressurizing member 70 has the endless belt 71 and the pads 72A, 72B. In this arrangement, compared to a hypothetical configuration, in which the heating member 50 has the endless belt, the distance between the faces of the ribs 110 that face toward the outer circumferential surface 51A of the heat roller 51 and the outer circumferential surface 51A of the heat roller 51 may be reduced, and deviation of the distance between the temperature sensor 30 and the outer circumferential surface 51A of the heat roller 51 may be reduced: in particular, deviation of the distance between the detectable face 30A of the temperature sensor 30 and the outer circumferential surface 51A of the heat roller 51 may be reduced. Therefore, the sensing accuracy of the temperature sensor 30 may be improved more reliably.

Moreover, in the fuser 5 according to the present embodiment, the sensor cover 200 including the base 201 and the windshield wall 210 is located on the side of the temperature sensor 30 opposite to the heat roller 51 to cover the temperature sensor 30. Therefore, the air currents around the fuser 5 including, for example, an air current around the process cartridge 7 toward the fuser 5 caused by the negative pressure produced by the exhaust fan 6F and an air current involved with the sheet SH exiting the process cartridge 7 and being conveyed to the fuser 5 may be restrained from reaching the temperature sensor 30.

Moreover, in the fuser 5 according to the present embodiment, the heated air around the temperature sensor 30 may be discharged upward through the opening 201H, and the temperature sensor 30 may be restrained from detecting higher temperatures. Therefore, the detected results from the temperature-detecting thermistor S1 and the temperature-compensating thermistor S2 may be restrained from deviating. Accordingly, the sensing accuracy of the temperature sensor 30 may be improved more reliably.

Moreover, the fuser 5 according to the present embodiment has the holder 100, which retains the temperature sensor 30, and to which the sensor cover 200 is attachable. The temperature sensor 30 is attachable to the connecting frame 90 through the holder 100 being attached to the connecting frame 90. In this arrangement, the temperature sensor 30 may be attached to the connecting frame 90 in easy manufacturing operations. Furthermore, compared to a hypothetical configuration, in which the sensor cover 200 is attached to a member different from the holder 100, the relative position of the temperature sensor 30 from the opening 201H in the sensor cover 200 and the windshield wall 210 may be restrained from deviating effectively.

Moreover, in the fuser 5 according to the present embodiment, as shown in FIG. 7, the third contact portion 203 in the sensor cover 200 may cause the force F3, which may urge the first end face 33M of the sensor board 33 against the lower two (2) of the first contact portions 131. Furthermore, the fourth contact portion 204 in the sensor cover 200 may generate the fourth F1, which may urge the second end face 33N of the sensor board 33 against the upper two (2) of the first contact portions 131, and the force F2, which may shift the sensor board 33 toward the second contact portions 132. Therefore, the temperature sensor 30 may be located at the correct position in the direction, in which the heat roller 51 and the temperature sensor 30 face each other, and in the direction, in which the heating member 50 rotates.

Moreover, in the fuser 5 according to the present embodiment, the four (4) first contact portions 131 may contact the first face 33A of the sensor board 33 at the four (4) corners. The third contact portion 203 may contact the edge of the first end face 33M of the sensor board 33 at the center in the lengthwise direction DL1. The fourth contact portion 204 may contact the edge of the second end face 33N of the sensor board 33 at the center in the lengthwise direction DL1. In this arrangement, areas of contact between the first contact portions 131 and the sensor board 33 may be reduced, and the heat from the heat roller 51 may be restrained from being transferred through the first contact portions 131 and the sensor board 33 to the temperature-detecting thermistor S1 or the temperature-compensating thermistor S2. Accordingly, the sensing accuracy of the temperature sensor 30 may be improved more reliably. In this arrangement, moreover, in order to place the heat roller 51 and the temperature sensor 30 in the correct positions with each other in the facing direction, the flexibility of the sensor board 33 may be used, and influence on the sensing accuracy causable by a difference in thickness of each sensor board 33 may be restrained. In other words, the temperature sensor 30 may be placed at the correct position easily.

Moreover, in the fuser 5 according to the present embodiment, at the cross section spreading orthogonally to the lengthwise direction DL1, as shown in FIG. 6, the first distance L1 between the detectable face 30A of the temperature sensor 30 and the main heater 58 is shorter than the second distance L2 between the detectable face 30A of the temperature sensor 30 and the sub-heater 59. Therefore, the detected results from the temperature-detecting thermistor S1 and the temperature-compensating thermistor S2 may be restrained from fluctuating due to the heat convection occurring in the area around the heat roller 51, and the temperature sensor 30 may be restrained from detecting higher temperatures. Accordingly, the sensing accuracy of the temperature sensor 30 may be improved more reliably, and the main heater 58 may be controlled with improved responsiveness to the temperatures detected by the temperature sensor 30.

Moreover, in the fuser 5 according to the present embodiment, at the cross section spreading orthogonally to the lengthwise direction DL1, as shown in FIG. 8, the third distance L3 between the detectable face 41A of the thermostat 41 and the main heater 58 is equal to the fourth distance L4 between the detectable face 41A of the thermostat 41 and the sub-heater 59. In this arrangement, when either one of the main heater 58 and the sub-heater 59 excessively heats up, the thermostat 41 may cut off the power supply to the main heater 58 and the sub-heater 59 reliably.

Although an example of carrying out the invention have been described, those skilled in the art will appreciate that there are numerous variations and permutations of the fuser that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

For example, the temperature sensor 30 may not necessarily be attached to the connecting frame 90 that forms a part of the supporting member to support the heating member 50 indirectly through the holder 100 but may be attached directly to a supporting member which is made of resin.

For another example, the plurality of ribs 110 may not necessarily be formed in the holder 100 to be attached to the connecting frame 90, but the plurality of ribs formed separately from the holder may be directly attached to the connecting frame. For another example, the plurality of ribs may be formed integrally with a supporting member to support the heating member 50 which is made of resin.

For another example, the sensor cover 200 may not necessarily be attached to the holder 100 to cover the temperature sensor 30 but may be attached directly to a supporting member to support the heating member 50. For another example, the sensor cover 200 may be attached to a member, e.g., the upper guide 65, which is different from the connecting frame 90 or the holder 100.

For another example, the temperature sensor 30 may not necessarily be the thermo-sensitive contactless temperature sensor that includes the temperature-detecting thermistor S1 and the temperature-compensating thermistor S2. For example, the temperature sensor may include a thermopile, in which a plurality of miniature thermocouples are connected serially. For another example, the temperature sensor may include a quantal contactless temperature sensor that may detect infrared rays as light through photoelectric elements.

For another example, one of the heating member and the pressurizing member may have a roller, and the other of the heating member and the pressurizing member may have the endless belt. For another example, the heating member and the pressurizing member may both have a roller.

The present disclosure may be applicable to, for example, an image forming apparatus and a multifunction peripheral machine.

What is claimed is:

1. A fuser configured to nip a sheet by a heating roller the heating roller being rotatable about a rotation axis, and a pressurizing member and to thermally fix an image formed in a toner on the sheet, the fuser comprising:
- a supporting member supporting the heating roller;
- a temperature sensor including a temperature-detecting element, the temperature sensor attached to the supporting member being configured to detect a temperature of the heating roller without contacting; and
- a plurality of ribs arranged on the supporting member, the plurality of ribs extending in a rotating direction of the heating roller along an outer circumferential surface of the heating roller at positions different from the temperature-detecting element in a lengthwise direction of the heating roller, the plurality of ribs including:
  - a first rib having a face facing the outer circumferential surface; and
  - a second rib located farther than the first rib from the temperature-detecting element in the lengthwise direction, the second rib having a face facing the outer circumferential surface,
- wherein a length of the face of the first rib in the lengthwise direction is greater than a length of the face of the second rib in the lengthwise direction, and
- wherein faces of the plurality of ribs facing the outer circumferential surface are curved in arcs which are centered about the rotation axis of the heating roller.

2. The fuser according to claim 1,
- wherein the plurality of ribs include a third rib, the third rib being located on a side opposite to the first rib across the temperature-detecting element in the lengthwise direction.

3. The fuser according to claim 2, further comprising
- a first enhancing rib connecting the first rib and the third rib, the first enhancing rib being located at a position different from the temperature-detecting element in the rotating direction.

4. The fuser according to claim 3, further comprising
- a second enhancing rib connecting the first rib and the third rib, the second enhancing rib being located on a side opposite to the temperature-detecting element across the first enhancing rib in the rotating direction,
- wherein the first enhancing rib is located upstream from the temperature sensor in the rotating direction,
- wherein the second enhancing rib is located upstream from the first enhancing rib in the rotating direction,
- wherein the first enhancing rib has a face facing the outer circumferential surface,
- wherein the second enhancing rib has a face facing the outer circumferential surface, and
- wherein a length of the face of the second enhancing rib in the rotating direction is greater than a length of the face of the first enhancing rib in the rotating direction.

5. The fuser according to claim 1,
- wherein the supporting member includes:
  - a pair of side frames configured to support the heating roller;
  - a connecting frame connecting the pair of side frames; and
  - a holder attached to the connecting frame, the holder retaining the temperature sensor and having the plurality of ribs formed integrally thereon.

6. The fuser according to claim 5,
- wherein the holder is fastened to the connecting frame with a screw at a central area in the lengthwise direction, the holder engaging with the connecting frame at separated positions on one side and the other side of the central area in the lengthwise direction.

7. The fuser according to claim 5, wherein the temperature sensor includes:

an absorber absorbing infrared rays from the heating roller;

a retainer retaining the absorber; and a sensor board, on which the retainer and the temperature-detecting element are arranged, the sensor board being retained by the holder, and wherein the temperature-detecting element includes:

a temperature-detecting thermistor configured to detect a temperature of the absorber; and a temperature-compensating thermistor configured to detect a temperature of the retainer.

8. The fuser according to claim 7, wherein the holder has a protector wall located between the sensor board and the heating roller, the protector wall extending along a light-guiding path that guides the infrared rays from the heating roller to the temperature sensor, the protector wall surrounding the light-guiding path in a tubular form, and wherein a gap is formed between the sensor board and an edge of the protector wall facing the sensor board.

9. The fuser according to claim 1, wherein the pressurizing member has an endless belt and a pad, the pad nipping the endless belt at a position between the heating roller and the pad.

10. The fuser according to claim 1, further comprising a sensor cover located on a side of the temperature sensor opposite to the heating roller, the sensor cover covering the temperature sensor, the sensor cover including:

a base having an opening at an upper position with respect to the temperature sensor; and a windshield wall located adjacent to the base, the windshield wall protruding upward and extending in the lengthwise direction.

11. A fuser configured to nip a sheet by a heating member and a pressurizing member and to thermally fix an image formed in a toner on the sheet, the fuser comprising:

a supporting member supporting the heating member;

a temperature sensor including a temperature-detecting element, the temperature sensor attached to the supporting member being configured to detect a temperature of the heating member without contacting; and a plurality of ribs arranged on the supporting member, the plurality of ribs extending in a rotating direction of the heating member along an outer circumferential surface of the heating member at positions different from the temperature-detecting element in a lengthwise direction of the heating member, the plurality of ribs including:

a first rib having a face facing the outer circumferential surface;

a second rib located farther than the first rib from the temperature-detecting element in the lengthwise direction, the second rib having a face facing the outer circumferential surface; and a third rib located on a side opposite to the first rib across the temperature-detecting element in the lengthwise direction, wherein a length of the face of the first rib in the lengthwise direction is greater than a length of the face of the second rib in the lengthwise direction, and wherein the fuser further comprises a first enhancing rib connecting the first rib and the third rib, the first enhancing rib being located at a position different from the temperature-detecting element in the rotating direction.

12. The fuser according to claim 11, further comprising a second enhancing rib connecting the first rib and the third rib, the second enhancing rib being located on a side opposite to the temperature-detecting element across the first enhancing rib in the rotating direction, wherein the first enhancing rib is located upstream from the temperature sensor in the rotating direction, wherein the second enhancing rib is located upstream from the first enhancing rib in the rotating direction, wherein the first enhancing rib has a face facing the outer circumferential surface, wherein the second enhancing rib has a face facing the outer circumferential surface, and wherein a length of the face of the second enhancing rib in the rotating direction is greater than a length of the face of the first enhancing rib in the rotating direction.

13. A fuser configured to nip a sheet by a heating member and a pressurizing member and to thermally fix an image formed in a toner on the sheet, the fuser comprising:

a supporting member supporting the heating member;

a temperature sensor including a temperature-detecting element, the temperature sensor attached to the supporting member being configured to detect a temperature of the heating member without contacting;

a plurality of ribs arranged on the supporting member, the plurality of ribs extending in a rotating direction of the heating member along an outer circumferential surface of the heating member at positions different from the temperature-detecting element in a lengthwise direction of the heating member, the plurality of ribs including:

a first rib having a face facing the outer circumferential surface; and a second rib located farther than the first rib from the temperature-detecting element in the lengthwise direction, the second rib having a face facing the outer circumferential surface, and a sensor cover located on a side of the temperature sensor opposite to the heating member, the sensor cover covering the temperature sensor, the sensor cover including:

a base having an opening at an upper position with respect to the temperature sensor; and a windshield wall located adjacent to the base, the windshield wall protruding upward and extending in the lengthwise direction, wherein a length of the face of the first rib in the lengthwise direction is greater than a length of the face of the second rib in the lengthwise direction.

* * * * *